(12) United States Patent
Wand et al.

(10) Patent No.: US 11,400,831 B1
(45) Date of Patent: Aug. 2, 2022

(54) PRE-CHARGE VIA BI-DIRECTIONAL DC/DC CONVERTER AND AUXILIARY BATTERY

(71) Applicant: Ford Global Technologies, LLC, Dearborn, MI (US)

(72) Inventors: Thomas Joseph Wand, Redmond, WA (US); Baojin Wang, Saline, MI (US); Benjamin A. Tabatowski-Bush, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/150,843

(22) Filed: Jan. 15, 2021

(51) Int. Cl.
*B60L 58/20* (2019.01)
*H02J 7/00* (2006.01)
*B60L 3/00* (2019.01)
*B60L 53/18* (2019.01)

(52) U.S. Cl.
CPC ............ *B60L 58/20* (2019.02); *B60L 3/0046* (2013.01); *B60L 53/18* (2019.02); *H02J 7/0063* (2013.01); *B60L 2210/10* (2013.01); *B60L 2270/20* (2013.01); *Y02T 10/7072* (2013.01); *Y02T 10/72* (2013.01)

(58) Field of Classification Search
CPC ...... Y02T 10/70; Y02T 10/7072; Y02T 10/72; B60L 2270/20; B60L 58/20; B60L 3/0046; H02J 2310/48
See application file for complete search history.

(56) References Cited

U.S. PATENT DOCUMENTS

| | | | |
|---|---|---|---|
| 8,575,940 B2 | 11/2013 | Yugou et al. | |
| 9,748,768 B2 * | 8/2017 | Smith | B60W 10/00 |
| 9,925,878 B2 | 3/2018 | Hashim et al. | |
| 2017/0113567 A1 * | 4/2017 | Koketsu | B60L 58/20 |

FOREIGN PATENT DOCUMENTS

| | | | |
|---|---|---|---|
| CN | 105518901 | | 7/2018 |
| JP | 2007209114 A | * | 8/2007 |
| JP | 2019088098 A | * | 6/2019 |

* cited by examiner

*Primary Examiner* — Ryan Johnson
(74) *Attorney, Agent, or Firm* — David B. Kelley; Brooks Kushman P.C.

(57) ABSTRACT

A power control arrangement for a vehicle includes a bi-directional DC/DC converter and one or more controllers. The one or more controllers, after a request to activate the vehicle, command the bi-directional DC/DC converter to charge a DC link capacitor electrically between main contactors and the bi-directional DC/DC converter to target value without connecting a resistor in parallel with one of the main contactors and before closing all of the main contactors.

9 Claims, 3 Drawing Sheets

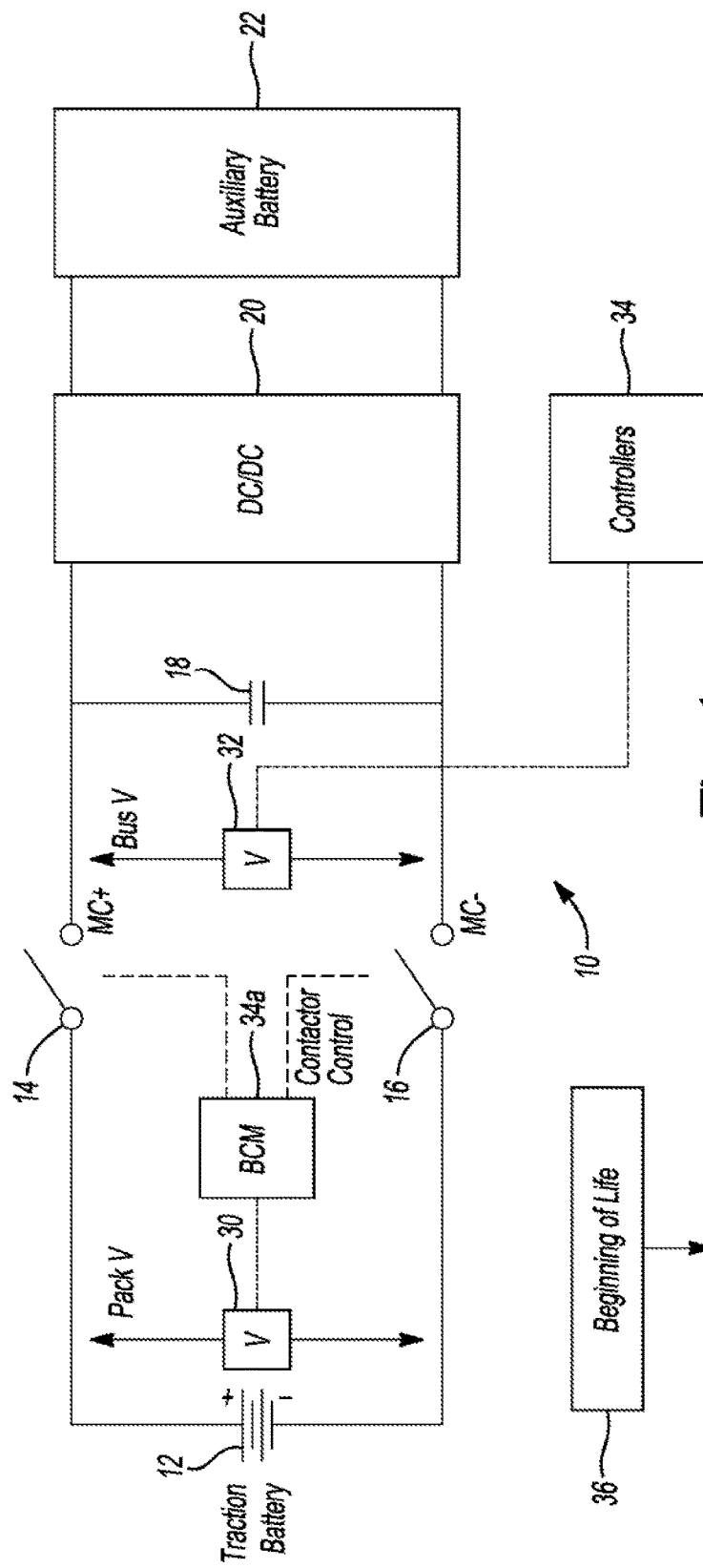
_Fig-1_
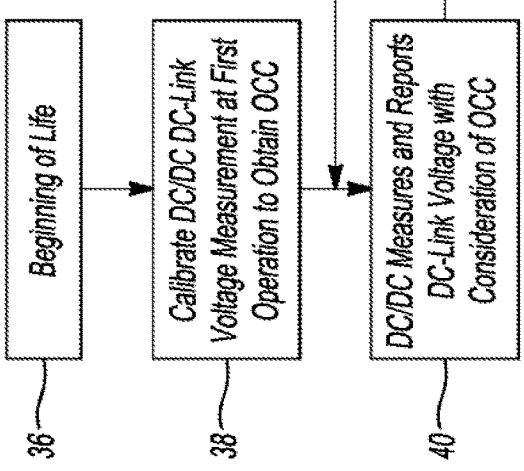
_Fig-2_

PRE-CHARGE VIA BI-DIRECTIONAL DC/DC CONVERTER AND AUXILIARY BATTERY

TECHNICAL FIELD

This disclosure relates to vehicle power electronic components.

BACKGROUND

Certain automotive vehicles may include traction batteries that provide energy to and store energy from one or more electric machines. Such traction batteries are connected with corresponding high voltage busses via contactors.

SUMMARY

A vehicle power system includes a traction battery, a bi-directional DC/DC converter, and main contactors to electrically connect the traction battery and bi-directional DC/DC converter when closed. The vehicle power system also includes a DC link capacitor electrically between the main contactors and bi-directional DC/DC converter. The bi-directional DC/DC converter is configured to charge the DC link capacitor to a target value before all of the main contactors are closed and without use of a resistor being in parallel with one of the main contactors.

A method includes following a request to activate a vehicle and prior to closing a main contactor to electrically connect a traction battery with a DC link capacitor, operating a bi-directional DC/DC converter to charge the DC link capacitor to a target voltage with energy from an auxiliary battery.

A power control arrangement for a vehicle includes a bi-directional DC/DC converter and one or more controllers. The one or more controllers, after a request to activate the vehicle, command the bi-directional DC/DC converter to charge a DC link capacitor electrically between main contactors and the bi-directional DC/DC converter to a target value without connecting a resistor in parallel with one of the main contactors and before closing all of the main contactors.

BRIEF DESCRIPTION OF THE DRAWINGS

FIG. 1 is a schematic diagram of a vehicle.

FIGS. 2, 3, and 4 are algorithms for calibrating voltage data used during pre-charge activities following vehicle activation.

DETAILED DESCRIPTION

Figure 3:
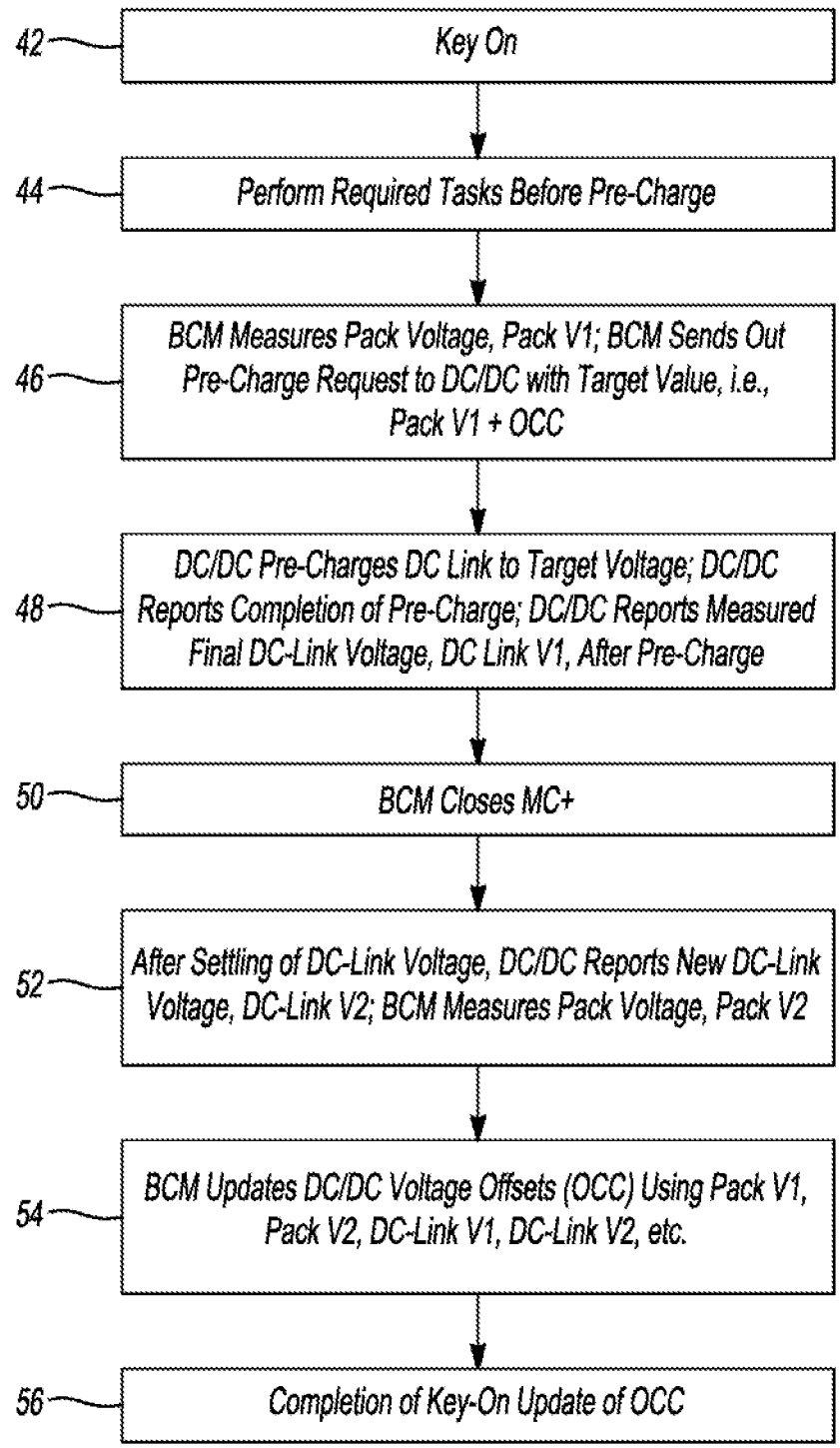

The disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

High voltage battery contactors are typically used to isolate battery cells from loads. Contactor issues increase with the voltage across it at closing due to high inrush currents. To activate the pack output terminals, one or more contactors are closed. Closing a contactor into a load that is not at the same voltage will drive a large instantaneous current to bring up the load side to the same voltage.

For a hybrid or electric vehicle there are often capacitors on the load side in the range of 1000 micro-farads or larger. Cell arrays can deliver currents over 1000 amps. Contactors can still be welded even with much lower currents from a rather low voltage closing. To avoid such welding, pre-charge circuits, multiple accurate measurement circuits, and time delays are often used.

Inside some battery packs, a battery energy control module may control operation of the contactors. It may do this based on voltage measurements to ensure the contactor voltage is less than a preset threshold. This, however, may present issues. The measurements should be done with potentially costly high accuracy electronic components that can crowd available circuit board space.

As mentioned above, a pre-charge resistor and relay may be placed in parallel with one of the main contactors. To account for uncertain measurements, a two-step approach is utilized. First, the voltage across the contactor is read, and when less than a fixed level, e.g., 20 volts, a timer is started in which a known time constant will assure the voltage across the contactor is reduced to less than another fixed level. e.g., 5 volts. The contactor is then closed. By waiting long enough, there should be no issues with contactor welding. This method, however, can be slow causing delayed startup battery activation.

At startup as explained above, a battery pack may immediately close the negative contactor. Then a pre-charge relay is closed to connect a resistor in parallel across the last contactor to pre-charge the load side. Once the load side measurement reaches the cell stack voltage within some predefined margin, the last contactor can be closed. Under such circumstances, the voltage measurement systems should be accurate to properly determine when the contactor will have a limited voltage across it. Since the cell stack voltage can be up to 300 volts and some even nearing 500 volts, even a 1% measurement error can lead to a 10 volt differential.

Here, approaches are identified that can eliminate the pre-charge contactor and pre-charge resistor, and reduce the time necessary to pre-charge and possible measurement error. A bi-directional DC/DC converter can be used to take energy from a 12 volt battery system and boost it to the needed load side voltage to match the pack voltage. Since this is an active approach to pre-charging the DC link capacitance rather than a passive approach that uses a pre-charge resistor, it may achieve the setpoint voltage in a fraction of the time that resistor-based methods take. With the DC/DC converter back charging the high voltage bus, a battery control module can incorporate a CAN bus message to inform the DC/DC converter as to the voltage level to set at the load side. This may reduce the to-be-closed contactor voltage differential to, for example, less than 1.0 volt.

The voltages on either side of the contactor can be handled in different ways. A first method is to externally calibrate the DC/DC voltage measuring function. At first operation such as in assembly, a fixed voltage is applied to the sensor circuit and read by the DC/DC converter. The DC/DC converter's microcontroller then calculates the difference and stores it as an offset calibration constant. This constant is then applied to scale future measurements.

A second method is on the first run, after the contactors close equalizing the DC link capacitor and pack voltage, the DC/DC converter reports its measured voltage to the battery control module to be recorded. Then every start up thereafter, the battery control module applies an offset to the DC/DC converter requested voltage to assure an accurate pre-charge voltage match.

A third method is after first contactor closure, the battery control module reports the pack voltage on the CAN bus, wherein the DC/DC converter calculates the error from its own DC link capacitor voltage and stores the offset to apply in subsequent runs. For subsequent startups, the DC/DC converter applies the offset to its voltage measured and published to assure an accurate pre-charge.

In these cases and others contemplated herein, the offset is then applied to a formula incorporating operating temperature and the voltage applied to properly scale future measurements. Additionally, with each subsequent startup, after contactor closing, a new offset can be determined to modify, increment, or simply replace the previous offset to maintain accurate calibration.

Referring to FIG. 1, a vehicle 10 includes a traction battery 12, main contactors 14, 16, a DC link capacitance 18, a DC/DC converter 20, and an auxiliary battery 22. The vehicle 10 also includes voltage sensors 30, 32, controllers 34 (including a DC/DC converter controller), and a battery control module 34a (battery controller), which is part of the controllers 34. The controllers 34 are in communication with exert control over the numbered components of FIG. 1. A number of high voltage modules may be connected to the DC link (high voltage bus). The aggregate capacitance of these high voltage modules is the DC link capacitance 18, as known in the art.

The controllers 34 may communicate via one or more vehicle networks. The vehicle network may include a plurality of channels for communication. One channel may be a serial bus such as CAN. One of the channels may include an Ethernet network defined by the Institute of Electrical and Electronics Engineers 802 family of standards. Additional channels may include discrete connections between modules and may include power signals from the auxiliary battery 22. Different signals may be transferred over different channels. For example, video signals may be transferred over a high-speed channel (e.g., Ethernet) while control signals may be transferred over CAN, etc.

The main contactors 14, 16 are electrically between the traction battery 12 and DC link capacitance 18. The DC link capacitance 18 is electrically between the main contactors 14, 16 and the DC/DC converter 20. The DC/DC converter 20 is electrically between the DC link capacitance 18 and the auxiliary battery 22. The DC/DC converter 20 is thus configured to bi-directionally transfer power between the DC link capacitance 18 and auxiliary battery 22. Power from the auxiliary battery 22 may thus be boosted by the DC/DC converter 20 for delivery to the DC link capacitance 18 while at least one of the main contactors 14, 16 is open.

The vehicle 10 may further include a transmission mechanically coupled between an electric machine and wheels such that mechanical power output by the electric machine can be transferred to the wheels to drive the vehicle 10, and mechanical power output by the transmission can be transferred to the electric machine for regenerative energy capture and storage in the traction battery 12, etc.

The voltage sensor 30 is arranged to sense a voltage of the traction battery 12 and the voltage sensor 32 is arranged to sense a voltage of the DC link capacitance 18. These measured values are available to the battery control module 34a and controllers 34 more generally.

Noticeably absent from the vehicle 10 is the typical pre-charge contactor and pre-charge resistor. As mentioned above, the DC/DC converter 20 may be used to charge the DC link capacitance 18 to a target voltage with energy from the auxiliary battery 22 so that the main contactors 14, 16 can be closed to electrically connect the traction battery 12 with the DC link capacitance 18 without welding the main contactors 14, 16. That is, prior to closing one or both of the main contactors 14, 16, the DC link capacitance 18 may be brought to a target voltage by operation of the DC/DC converter 20. Identification of the target voltage is discussed in more detail below.

Referring to FIG. 2, an algorithm for initially calibrating voltage sensors, such as the voltage sensors 30, 32 of FIG. 1, initiates with operation 36 at beginning of life, which could be at the factory during assembly. At operation 38, the DC link voltage measurement may be calibrated at first operation to obtain an offset calibration constant (OCC). Test equipment may externally apply a known fixed voltage across the voltage sensor, which can then be detected by the sensor and reported to the system. In the example of FIG. 1, a known fixed voltage can be applied across the voltage sensor 32 such that the controllers 34 obtain the measured voltage. The difference between the known fixed voltage and the measured value is the offset calibration constant. At operation 40, the DC/DC converter system may measure and report the DC link voltage with consideration of the offset calibration constant. The controllers 34, in the example of FIG. 1, may measure and report the voltage measured by the voltage sensor 32 taking account of the offset calibration constant obtained at operation 38.

Referring to FIG. 3, an algorithm for performing certain vehicle start up activities initiates with operation 42 at key on (or vehicle activation for vehicles lacking traditional keys). At operation 44, various known required tasks before pre-charging may be performed. At operation 46, a battery control module (BCM) may measure the battery pack voltage, and send a pre-charge request to the DC/DC converter system with a target value set equal to a sum of the battery pack voltage and offset calibration constant. In the example of FIG. 1, the battery control module 34a may measure the voltage of the traction battery 12 via the voltage sensor 30, and send a pre-charge request to the controllers 34 with a target value set equal to a sum of the voltage of the traction battery 12 and offset calibration constant obtained from the algorithm of FIG. 2. At operation 48, the DC/DC converter system may pre-charge the DC link to the target voltage, report completion of the pre-charge, and report the measured final DC link voltage. In the example of FIG. 1, under the command of the controllers 34, the DC/DC converter 20 may use energy from the auxiliary battery 22 to charge the DC link capacitance 18 to the target value. At completion of the pre-charge, the controllers 34 may measure the voltage of the DC link capacitance 18 via the voltage sensor 32, and report the measured value. At operation 50, the battery control module closes the remaining open contactor(s). In the example of FIG. 1, the battery control module 34a closes the main contactor 14.

At operation 52, after settling of the DC link voltage, the DC/DC converter system may measure and report the new DC link voltage and the battery control module may measure the battery pack voltage. In the example of FIG. 1, the controllers 34 may measure the voltage of the DC link capacitance 18 via the voltage sensor 32, and broadcast the measured value to the battery control module 34a. Likewise, the battery control module 34a may measure the voltage of the traction battery 12. At operation 54, the battery control module may update the offset calibration constants using the measured values from operation 52. In the example of FIG. 1, the battery control module 34a uses the measured voltage values from operation 52 to update the offset calibration constant for future use. At operation 56, the update of the offset calibration constant may be completed, in the example of FIG. 1, the battery control module 34a may store the updated calibration constant to memory, etc.

Figure 4:
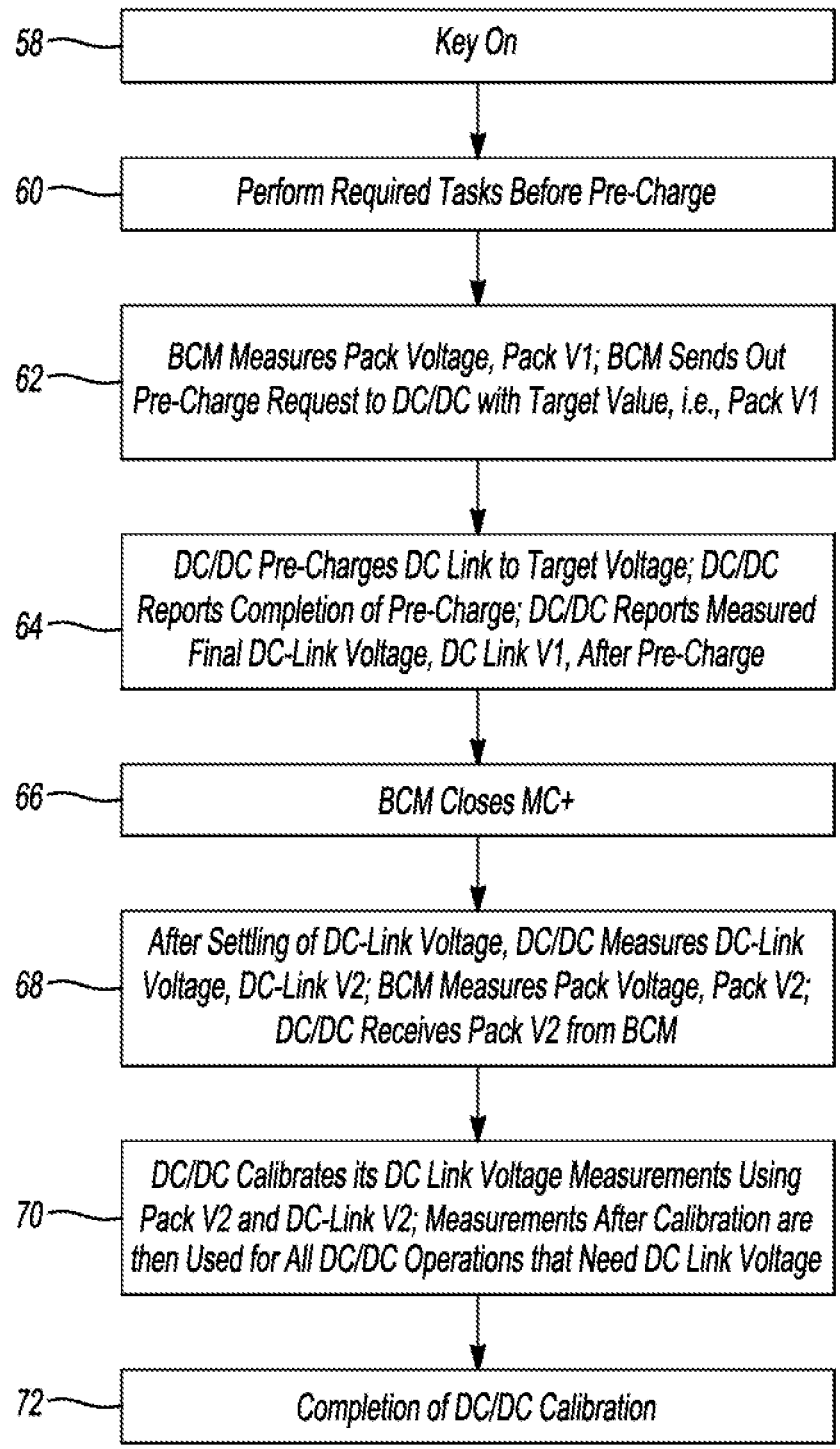

Referring to FIG. 4, another algorithm for performing certain vehicle start up activities initiates with operation 58 at key on (vehicle activation). At operation 60, various known required tasks before pre-charging may be performed. At operation 62, a battery control module may measure the battery pack voltage, and send a pre-charge request to the DC/DC converter system with a target value set equal to the battery pack voltage. In the example of FIG. 1, the battery control module 34a may measure the voltage of the traction battery 12 via the voltage sensor 30, and send a pre-charge request to the controllers 34 with a target value set equal to the voltage of the traction battery 12. At operation 64, the DC/DC converter system may pre-charge the DC link to the target voltage, report completion of the pre-charge, and report the measured final DC link voltage. In the example of FIG. 1, under the command of the controllers 34, the DC/DC converter 20 may use energy from the auxiliary battery 22 to charge the DC link capacitance 18 to the target value. At completion of the pre-charge, the controllers 34 may measure the voltage of the DC link capacitance 18 via the voltage sensor 32, and report the measured value. At operation 66, the battery control module closes the remaining open contactor(s). In the example of FIG. 1, the battery control module 34a closes the main contactor 14.

At operation 68, after settling of the DC link voltage, the DC/DC converter system may measure the new DC link voltage and the battery control module may measure and report the battery pack voltage. In the example of FIG. 1, the controllers 34 may measure the voltage of the DC link capacitance 18 via the voltage sensor 32. Likewise, the battery control module 34a may measure the voltage of the traction battery 12, and broadcast the measured value to the controllers 34. At operation 70, the controllers may update the offset calibration constants using the measured values from operation 68. In the example of FIG. 1, the controllers 34 use the measured voltage values from operation 68 to update the offset calibration constant for future use. At operation 72, the update of the offset calibration constant may be completed. In the example of FIG. 1, the controllers 34 may store the updated calibration constant to memory, etc.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other agnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The offset, for example, may be implemented by providing an analog offset to the measurement circuits where it can be summed together with any measured voltage. Other devices/modules connected with the DC link may be used to perform the voltage measurements, or provide verification of the link voltage, etc.

The words used in the specification are words of description rather than limitation, and it is understood that various changes can be made without departing from the spirit and scope of the disclosure. The term "contactor," for example, is meant to include other breaking elements such as relays, switches, transistors, etc.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle power system comprising:
a traction battery;
a bi-directional DC/DC converter;
main contactors configured to electrically connect the traction battery and bi-directional DC/DC converter when closed;
a DC link capacitor electrically between the main contactors and bi-directional DC/DC converter, wherein the bi-directional DC/DC converter is configured to charge the DC link capacitor to a target value before all of the main contactors are closed and without use of a resistor being in parallel with one of the main contactors; and
one of more controllers programmed to
specify the target value according to a voltage of the traction battery and a stored offset calibration constant,
obtain measured voltage values of the traction battery and DC link capacitor before and after the main contactors are closed, and
update the offset calibration constant based on the measured voltage values.

2. The vehicle power system of claim 1, wherein the one or more controllers includes a battery controller programmed to update the offset calibration constant based on the measured voltage values.

3. The vehicle power system of claim 1, wherein the one or more controllers includes a DC/DC controller programmed to update the offset calibration constant based on the measured voltage values.

4. The vehicle power system of claim 1 further comprising an auxiliary battery, wherein the bi-directional DC/DC converter is further configured to charge the DC link capacitor with energy from the auxiliary battery.

5. A method comprising:
following a request to activate a vehicle and prior to closing a main contactor to electrically connect a traction battery with a DC link capacitor, operating a bi-directional DC/DC converter to charge the DC link capacitor to a target voltage with energy from an auxiliary battery without electrically connecting a resistor in parallel with the main contactor;
specifying the target voltage according to a voltage of the traction battery and a stored offset calibration constant;
obtaining measured voltage values of the traction battery and DC link capacitor before and after the main contactors are closed; and
updating the offset calibration constant based on the measured voltage values.

6. The method of claim 5 further comprising after the DC link capacitor achieves the target voltage, closing the main contactor.

7. A power control arrangement for a vehicle, comprising:
a bi-directional DC/DC converter; and
one or more controllers programmed to,
after a request to activate the vehicle, command the bi-directional DC/DC converter to charge a DC link capacitor electrically between main contactors and the bi-directional DC/DC converter to a target value without connecting a resistor in parallel with one of the main contactors and before closing all of the main contactors,
specify the target value according to a voltage of a traction battery and a stored offset calibration constant,
obtain measured voltage values of the traction battery and DC link capacitor before and after the main contactors are closed, and
update the offset calibration constant based on the measured voltage values.

8. The power control arrangement of claim 7, wherein the one or more controllers includes a battery controller programmed to update the offset calibration constant based on the measured voltage values.

9. The power control arrangement of claim 7, wherein the one or more controllers includes a DC/DC controller programmed to update the offset calibration constant based on the measured voltage values.

* * * * *